(12) United States Patent
Oyama

(10) Patent No.: US 11,609,568 B2
(45) Date of Patent: Mar. 21, 2023

(54) TRAVEL CONTROL SYSTEM FOR VEHICLE

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 821 days.

(21) Appl. No.: 16/433,805

(22) Filed: Jun. 6, 2019

(65) Prior Publication Data
US 2020/0064839 A1 Feb. 27, 2020

(30) Foreign Application Priority Data

Aug. 24, 2018 (JP) .............................. JP2018-157533

(51) Int. Cl.
G05D 1/00 (2006.01)
G05D 1/02 (2020.01)
(52) U.S. Cl.
CPC ......... *G05D 1/0088* (2013.01); *G05D 1/0061* (2013.01); *G05D 1/0223* (2013.01)
(58) Field of Classification Search
CPC .. G05D 1/0088; G05D 1/0061; G05D 1/0223; G05D 2201/0213; G05D 1/021;
(Continued)

(56) References Cited

U.S. PATENT DOCUMENTS

2010/0125399 A1\* 5/2010 Grolle ................. B60W 10/184
180/170
2016/0304124 A1\* 10/2016 Fujiyoshi ............. B62D 15/025
(Continued)

FOREIGN PATENT DOCUMENTS

JP 2002-032125 A 1/2002
JP 2011-108016 A 6/2011
(Continued)

OTHER PUBLICATIONS

Translation of Description of JP-2017052300-A (Year: 2017).\*
(Continued)

*Primary Examiner* — Kenneth J Malkowski
*Assistant Examiner* — Ibrahim Abdoalatif Alsomairy
(74) *Attorney, Agent, or Firm* — McDermott Will & Emery LLP

(57) ABSTRACT

A travel control system for a vehicle includes a vehicle speed calculator, a mode continuation determiner, and a mode continuing unit. The vehicle speed calculator evaluates a level of worsening of a traveling environment and calculates a first vehicle speed on the basis of the level of the worsening of the traveling environment. The mode continuation determiner determines whether it is possible to continue with driving assist control in the second driving assist mode by comparing a second vehicle speed in the second driving assist mode with the first vehicle speed. When it is not possible to continue with the driving assist control in the second driving assist mode, the mode continuing unit lowers the second vehicle speed in the second driving assist mode to the first vehicle speed to allow the driving assist control in the second driving assist mode to continue.

2 Claims, 7 Drawing Sheets

(58) Field of Classification Search
CPC ...... G05D 1/0066; G05D 13/00; B60K 28/10; B60W 60/0053; B60W 2050/0095; B60W 2552/00; B60W 2555/20; B60W 30/143; B60W 60/00184; B60W 60/00186; B60W 60/00182; B60W 30/182; B60W 10/06; B60W 10/10; B60W 10/18; B60W 10/20; B60W 50/14; B60W 2050/143; B60W 2710/06; B60W 2710/0616; B60W 2710/10; B60W 2710/18; B60W 2710/20; B62D 15/025; B62D 6/02

See application file for complete search history.

(56) References Cited

U.S. PATENT DOCUMENTS

2018/0065635 A1* 3/2018 Urano ............... G05D 1/0061
2018/0348758 A1* 12/2018 Nakamura ............ B60W 50/14
2019/0001941 A1* 1/2019 Westlund ........ B60W 30/18109
2020/0050190 A1* 2/2020 Patel ................ G05D 1/0027
2020/0231182 A1* 7/2020 Oba ................. G05D 1/0061

FOREIGN PATENT DOCUMENTS

| JP | 2011-131838 A |   | 7/2011 |
| JP | 2015-141101 A |   | 8/2015 |
| JP | 2017-052300 A |   | 3/2017 |
| JP | 2017052300 A | * | 3/2017 |
| JP | 2017-128180 A |   | 7/2017 |

OTHER PUBLICATIONS

Translation of Claim of JP-2017052300-A (Year: 2017).*
JP-2017052300-A Translation (Year: 2017).*
Japanese Notification of Reasons for Refusal issued in corresponding Japanese Patent Application No. 2018-157533, dated Feb. 4, 2020, with English translation.

* cited by examiner

TRAVEL CONTROL SYSTEM FOR VEHICLE

CROSS-REFERENCE TO RELATED APPLICATIONS

The present application claims priority from Japanese Patent Application No. 2018-157533 filed on Aug. 24, 2018, the entire contents of which are hereby incorporated by reference.

BACKGROUND

The technology relates to a travel control system that controls traveling of a vehicle.

In order to reduce a burden on a driver and achieve comfortable and safe traveling of vehicles such as automobiles, systems for automatic driving of a vehicle have been developed which do not require the drive to hold the steering wheel. Some of such systems are in practical use. In order to achieve this automatic driving, more reliable sensing of the surrounding environment and stability of the road environment are needed. In a case where the surrounding environment or the road environment worsens, it is desirable to limit the automatic driving operation of the vehicle or to make a transition from the automatic driving to a driving assist mode that requires the driver to hold the steering wheel.

For example, Japanese Unexamined Patent Application Publication No. 2017-128180 discloses a technique in which control of only part of the driving operation difficult to be retained by the automatic driving is turned over to the driver and control of the remaining part of the driving operation is retained by the automatic driving.

SUMMARY

An aspect of the technology provides a travel control system for a vehicle. The travel control system includes a manual driving mode, a first driving assist mode in which driving assist control is performed on a precondition that a driver holds a steering wheel, and a second driving assist mode in which the driving assist control is performed without requiring the driver to hold the steering wheel. The travel control system includes a vehicle speed calculator, a mode continuation determiner, and a mode continuing unit. The vehicle speed calculator is configured to evaluate a level of worsening of a traveling environment during traveling in the second driving assist mode and to calculate, on a basis of the level of the worsening of the traveling environment, a first vehicle speed that enables the second driving assist mode to continue. The mode continuation determiner is configured to determine whether it is possible to continue with the driving assist control in the second driving assist mode by comparing a second vehicle speed in the second driving assist mode with the first vehicle speed. The mode continuing unit is configured to lower the second vehicle speed in the second driving assist mode to the first vehicle speed to allow the driving assist control in the second driving assist mode to continue when the mode continuation determiner determines that it is not possible to continue with the driving assist control in the second driving assist mode.

An aspect of the technology provides a travel control system for a vehicle. The travel control system includes a manual driving mode, a first driving assist mode in which driving assist control is performed on a precondition that a driver holds a steering wheel, and a second driving assist mode in which the driving assist control is performed without requiring the driver to hold the steering wheel. The travel control system includes a vehicle speed calculator, a mode continuation determiner, a mode selector, and a mode continuing unit. The vehicle speed calculator is configured to evaluate a level of worsening of a traveling environment during traveling in the second driving assist mode and to calculate, on a basis of the level of the worsening of the traveling environment, a first vehicle speed that enables the second driving assist mode to continue. The mode continuation determiner is configured to determine whether it is possible to continue with the driving assist control in the second driving assist mode by comparing a second vehicle speed in the second driving assist mode with the first vehicle speed. The mode selector is configured to select either one of a continuation of the second driving assist mode and a transition to the first driving assist mode when the mode continuation determiner determines that it is not possible to continue with the driving assist control in the second driving assist mode. The mode continuing unit is configured to lower the second vehicle speed in the second driving assist mode to the first vehicle speed to allow the driving assist control in the second driving assist mode to continue when the mode selector selects the continuation of the second driving assist mode.

An aspect of the technology provides a travel control system for a vehicle. The travel control system includes a manual driving mode, a first driving assist mode in which driving assist control is performed on a precondition that a driver holds a steering wheel, and a second driving assist mode in which the driving assist control is performed without requiring the driver to hold the steering wheel. The travel control system includes circuitry configured to: evaluate a level of worsening of a traveling environment during traveling in the second driving assist mode and calculate, on a basis of the level of the worsening of the traveling environment, a first vehicle speed that enables the second driving assist mode to continue; determine whether it is possible to continue with the driving assist control in the second driving assist mode by comparing a second vehicle speed in the second driving assist mode with the first vehicle speed; and lower the second vehicle speed in the second driving assist mode to the first vehicle speed to allow the driving assist control in the second driving assist mode to continue when it is determined that it is not possible to continue with the driving assist control in the second driving assist mode.

An aspect of the technology provides a travel control system for a vehicle. The travel control system includes a manual driving mode, a first driving assist mode in which driving assist control is performed on a precondition that a driver holds a steering wheel, and a second driving assist mode in which the driving assist control is performed without requiring the driver to hold the steering wheel. The travel control system includes circuitry configured to: evaluate a level of worsening of a traveling environment during traveling in the second driving assist mode and calculate, on a basis of the level of the worsening of the traveling environment, a first vehicle speed that enables the second driving assist mode to continue; determine whether it is possible to continue with the driving assist control in the second driving assist mode by comparing a second vehicle speed in the second driving assist mode with the first vehicle speed; select either one of a continuation of the second driving assist mode and a transition to the first driving assist mode when it is determined that it is not possible to continue with the driving assist control in the second driving assist mode; and lower the second vehicle speed in the second driving assist mode to the first vehicle speed to allow the driving assist control in the second driving assist mode to continue when the continuation of the second driving assist mode is selected.

DETAILED DESCRIPTION

Figure 1:
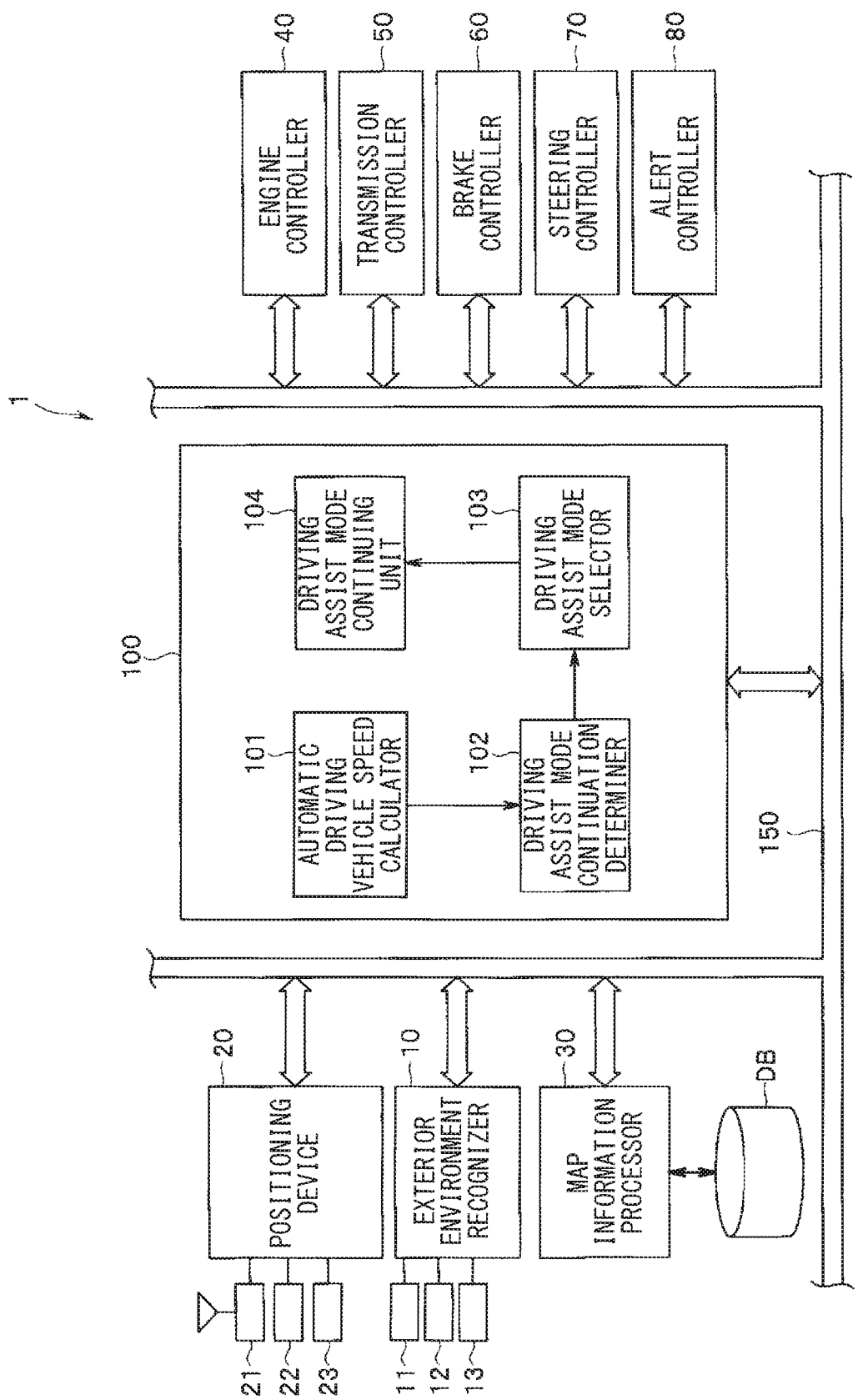
FIG. 1 is a configuration diagram illustrating an example travel control system for a vehicle according to one embodiment of the technology.

Hereinafter, some embodiments of the technology are described with reference to the drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In automatic driving technologies, whether it is possible to continue with automatic driving may be determined uniquely from worsening of a traveling environment, for example. However, even if the traveling environment worsens, it is possible, in some cases, to continue with the automatic driving depending on conditions. In such cases, if the vehicle uniquely limits the automatic driving operation or makes a transition to a driving assist mode in which the driver is supposed to hold the steering wheel, the driver has to assume a driving posture in a short period of time. This may increase a burden on the driver and also compromise the convenience of the automatic driving.

It is desirable to provide a travel control system for a vehicle that makes it possible to enhance the convenience for a driver. FIG. 1 illustrates an example configuration of a travel control system 1 for a vehicle, such as an automobile. The travel control system 1 may execute travel control including autonomous automatic driving of a vehicle. The travel control system 1 may include a travel controller 100, an exterior environment recognizer 10, a positioning device 20, a map information processor 30, an engine controller 40, a transmission controller 50, a brake controller 60, a steering controller 70, and an alert controller 80. These components of the travel control system 1 may be in network connection via a communication bus 150.

The exterior environment recognizer 10 may include various devices that recognize an environment and various sensors that detect an outside environment in which a host vehicle travels. In this example, the various devices that recognize an environment may include an on-board camera unit 11 and a radar device 12, such as a millimeter-wave radar or a laser radar. The various sensors that detect the outside environment may include an outside temperature sensor 13 that detects an outside temperature, which may serve as one example weather condition. The exterior environment recognizer 10 may recognize the exterior environment surrounding the host vehicle on the basis of various pieces of information, such as information on an object surrounding the host vehicle and detected with, for example, the camera unit 11 or the radar device 12; environment information including the outside temperature detected with the outside temperature sensor 13; traffic information acquired through road-to-vehicle communication, vehicle-to-vehicle communication, or another infrastructure communication; position information of the host vehicle obtained with the positioning device 20; and map information from the map information processor 30.

For example, the camera unit 11 may be a stereo camera that includes two cameras that capture respective images of a single object from different points of sight. In this example, the exterior environment recognizer 10 may stereoscopically process a pair of right and left images captured with the stereo camera to recognize the exterior environment in a three-dimensional manner. The camera unit 11 or the stereo camera may have, for example, two color cameras with synchronous shutters. These color cameras may be disposed near a rearview mirror on the interior side of the windshield in an upper portion of the vehicle compartment, and may be arrayed on right and left in a vehicle-width direction at a predetermined base line length. The two color cameras may each include, for example but not limited to, a charge-coupled device (CCD) or a complementary metal-oxide semiconductor (CMOS).

The exterior environment recognizer 10 may perform a matching process on the basis of the pair of right and left images captured by the camera unit 11 or the stereo camera to determine a pixel displacement amount (i.e., parallax) between corresponding positions in the right image and the left image. The exterior environment recognizer 10 may convert the pixel displacement amount into, for example but not limited to, luminance data (i.e., a pixel value) to generate a distance image. The exterior environment recognizer 10 may also convert, using triangulation, a point on the distance image into a coordinate point in an real space having an X-axis extending in the vehicle-width direction of the host vehicle or a right-left direction, a Y-axis extending in a vehicle-height direction, and a Z-axis extending in a vehicle-length direction or a distance (depth) direction. This allows for three-dimensional recognition of a lane line dividing the road on which the host vehicle is traveling (also referred to as a lane-dividing line), an obstacle, a vehicle traveling in front of the host vehicle, for example.

The lane line dividing the road or the lane-dividing line may be recognized by extracting a group of potential points of the lane line from the image and connecting these potential points of the lane line to produce a straight line or a curved line. For example, the exterior environment recognizer 10 may detect, on a plurality of search lines extending in a horizontal direction or the vehicle-width direction within a lane-line detection region set in the image, an edge at which the luminance or the pixel value changes by a predetermined amount or greater. The exterior environment recognizer 10 may thereby detect a pair of a lane line start point and lane line end point on each search line and extract, as a potential lane line point, a region between the lane line start point and the lane line end point.

Thereafter, the exterior environment recognizer 10 may derive approximation models of right and left lane lines by processing time-series data of spatial coordinate positions of the potential lane line points based on a vehicle movement amount per unit time, and may recognize the lane lines through these approximation models. Specific but non-limiting examples of the approximation model of the lane line used in this example embodiment may include an approximation model in which straight line components obtained through the Hough transform are connected or a model approximated by a parabolic curved line, for example.

The positioning device 20 may detect a vehicle position of the host vehicle by carrying out positioning based mainly on signals from a plurality of navigation satellites, such as global navigation satellite system (GNSS). In a case where the positioning accuracy has decreased, for example, due to worsening in the condition of picking up signal or radio waves from the satellites or due to an influence of multipath caused by reflection of the radio waves, the positioning device 20 may detect a vehicle position of the host vehicle through a combined use of the positioning with the navigation satellites and positioning with autonomous navigation using an on-board sensor, such as a gyro sensor 22 or a vehicle-speed sensor 23.

In the positioning with a plurality of navigation satellites, the positioning device 20 may receive, via a receiver 21, signals including information on, for example but not limited to, the path and the time transmitted from the navigation satellites. On the basis of the received signal, the positioning device 20 may determine the position of the host vehicle in the form of an absolute position that includes the longitude, the latitude, the altitude, and the time information. In the positioning with the autonomous navigation, the positioning device 20 may determine the position of the host vehicle in the form of an amount of relative position change on the basis of the traveling orientation of the host vehicle detected with the gyro sensor 22 and the moving distance of the host vehicle that is calculated from, for example, vehicle speed pulses output from the vehicle-speed sensor 23.

The positioning device 20 may include a communication unit therein. The communication unit may acquire traffic information via an infrastructure communication, such as road-to-vehicle communication or vehicle-to-vehicle communication.

The map information processor 30 may identify, referring to the map database DB, the position of the host vehicle on map data in a map database DB on the basis of the position data of the host vehicle determined by the positioning device 20, and may output information on the identified position. The map database DB may hold a high-accuracy map created for vehicle control including automatic driving, such as driving assist control. The map database DB may be stored in a large-capacity storage medium, such as a hard disk drive (HDD) or a solid state drive (SSD).

In a specific but non-limiting example, the high-accuracy map may include a multidimensional or dynamic map that holds, in a plurality of layers, static information, such as the shape of a road or a connection relationship of roads, and dynamic information, such as the traffic information collected through the infrastructure communication. The map database DB may include road data. The road data may include information on, for example but not limited to, the type of lane lines on a road, the number of traveling lanes, the width of each traveling lane, point sequence data indicating a widthwise center position in each traveling lane, the curvature of each traveling lane, the traveling azimuth of each traveling lane, and the speed limit. The road data may be stored with attribute data, such as the reliability of the data or the update date of the data.

Further, the map information processor 30 may maintain and manage the map database DB and verify nodes, links, and data points in the map database DB to constantly keep the map database DB up-to-date. The map information processor 30 may also create and add new data for a region in which no data is present in the database and construct a more detailed database. The data in the map database DB may be updated or new data may be added to the map database DB through comparison of the position data obtained by the positioning device 20 with the data stored in the map database DB.

Information from the map information processor 30 may be transmitted mainly to the travel controller 100 and may also be transmitted to another controller if necessary.

The engine controller 40 may control the running condition of an engine (not illustrated) on the basis of signals from various sensors that detect the running condition of the engine and various pieces of control information transmitted via the communication bus 150. The engine controller 40 may execute engine control mainly including fuel injection control, ignition timing control, and lift control of an electronic control throttle valve on the basis of an intake air amount, a throttle lift, an engine water temperature, an intake temperature, an air-fuel ratio, a crank angle, an accelerator position, and other vehicle information, for example.

The transmission controller 50 may control the pressure of oil to be supplied to an automatic transmission (not illustrated) and control the automatic transmission in accordance with preset transmission characteristics on the basis of signals from sensors that detect, for example but not limited to, a transmission position and a vehicle speed as well as various pieces of control information transmitted via the communication bus 150.

The brake controller 60 may control brake devices (not illustrated) on four wheels, independently of a brake operation of the driver, on the basis of a brake switch, wheel speeds of the four wheels, a steering angle, a yaw rate, and other vehicle information, for example. The brake controller 60 may also perform, for example but not limited to, antilock brake system control and anti-skid control by calculating a brake fluid pressure on each wheel on the basis of a braking force on each wheel.

The steering controller 70 may control steering torque of an electric power steering motor (not illustrated) provided in a steering system on the basis of the vehicle speed, the steering torque of the driver, the steering angle, the yaw rate, and other vehicle information. The control of the steering torque may be implemented by controlling a current to be fed to the electric power steering motor for achieving target steering torque that makes the actual steering angle and the target steering angle coincide with each other. In a case where there is no override by the driver operating the steering wheel, a driving current to be fed to the electric power steering motor may be controlled through proportional integral differential (PID) control, for example.

The alert controller 80 may control an output of an alert given for notifying of a malfunction occurring in any device in the vehicle or for calling the driver's attention and an output of various pieces of information to be presented to the driver. The alert controller 80 may alert or present information to the driver with the use of a visual output, such as a monitor, a display, or an alarm light, or an auditory output, such as a speaker or a buzzer, or both, for example. While driving assist control including automatic driving is being executed, the alert controller 80 may present the driver with the control state of the driving assist control. Further, in a case where the driving assist control including the automatic driving is suspended through the driver's operation, the alert controller 80 may inform the driver of the driving condition held at that point.

Next, the travel controller 100 of the travel control system 1 is described. When the driver sets a driving mode to a travel mode with driving assistance by operating a switch or a panel (not illustrated) while control in a manual driving mode that requires the driver to hold the steering wheel is being executed, the travel controller 100 may execute control in a driving assist mode including automatic driving via the engine controller 40, the transmission controller 50, the brake controller 60, and the steering controller 70. In the example embodiment, the driving assist mode set in the travel controller 100 may be preloaded with a manual driving mode, a first driving assist mode, a second driving assist mode, and an automatic stopping mode that causes the host vehicle to automatically stop at a safe location, such as a side strip along a road.

In the manual driving mode, the host vehicle may travel in accordance with the driver's driving operation including a steering operation, an accelerator operation, and a brake operation. In contrast to the manual driving mode, in the first driving assist mode and the second driving assist mode, when a preceding vehicle traveling in front of the host vehicle is recognized, on the road on which the host vehicle is traveling, by, for example but not limited to, the exterior environment recognizer 10, a target route may be set on the basis of, for example but not limited to, a traveling path of the preceding vehicle, and the host vehicle may be able to automatically travel following the preceding vehicle without crossing over the lane line, for example. Further, in the first and second driving assist modes, when no vehicle is recognized in front of the host vehicle, a route to a destination or any other location may be set for the host vehicle, and the host vehicle may be able to travel automatically along the route at a set vehicle speed, which may correspond to a target vehicle speed.

The first and second driving assist modes basically share a feature that they are both an automatic driving mode in which the host vehicle automatically travels on the basis of sensing information on the traveling environment and the recognition information. However, the first driving assist mode may be a driving mode in which the driving assist control is executed on a precondition that the driver holds the steering wheel, whereas the second driving assist mode may be a driving mode in which the driving assist control is executed without requiring the driver to hold the steering wheel. In other words, the first driving assist mode may be a driving mode with a lower level of automatic driving than that of the second driving assist mode, whereas the second driving assist mode is a driving mode with a higher level of automatic driving than that of the first driving assist mode. In a case where it becomes difficult to continue with the driving assistance in the second driving assist mode, the driving mode may go through a transition from the second driving assist mode to the first driving assist mode, the manual driving mode, or the automatic stopping mode, depending on conditions.

For example, whether the driver is holding the steering wheel may be determined through a detection of a grip of the driver on the steering wheel. In a specific but non-limiting example, the travel controller 100 may determine whether the driver is holding the steering wheel on the basis of a signal from, for example but not limited to, a steering wheel touch sensor (not illustrated) that turns on when the driver grips the steering wheel.

While the host vehicle is traveling in the second driving assist mode that does not require the driver to hold the steering wheel, the travel controller 100 may monitor a change in the traveling environment and determine whether it is possible to continue with the second driving assist mode despite any worsening of the traveling environment. In a specific but non-limiting example, the travel controller 100 may quantitate and evaluate the level of worsening of the traveling environment while the host vehicle is traveling in the second driving assist mode. On the basis of the result of the evaluation, the travel controller 100 may calculate an automatic driving enabling vehicle speed $Vd1$ that enables the second driving assist mode to continue. Note that the automatic driving enabling vehicle speed $Vd1$ may serve as a "first vehicle speed" in one embodiment. In order to continue the automatic driving while ensuring a margin of safety in the automatic driving, the automatic driving enabling vehicle speed $Vd1$ may be lowered as the traveling environment worsens.

The travel controller 100 may determine whether a set vehicle speed $Vat$ in the second driving assist mode is higher than the automatic driving enabling vehicle speed $Vd1$. Note that the set vehicle speed $Vat$ in the second driving assist mode may serve as a "second vehicle speed" in one embodiment. In a case where the set vehicle speed $Vat$ is equal to or lower than the automatic driving enabling vehicle speed $Vd1$ (i.e., $Vat \leq Vd1$), the travel controller 100 may allow the second driving assist mode to continue. In contrast, in a case where the set vehicle speed $Vat$ is higher than the automatic driving enabling vehicle speed $Vd1$ (i.e., $Vat > Vd1$), the travel controller 100 may lower the set vehicle speed $Vat$ to the automatic driving enabling vehicle speed $Vd1$ to allow the second driving assist mode to continue.

In other words, in a case where the automatic driving enabling vehicle speed $Vd1$ becomes lower than the traveling speed while the host vehicle is traveling in the second driving assist mode, the travel controller 100 may lower the traveling speed to the automatic driving enabling vehicle speed $Vd1$ to set a new set vehicle speed $Vat$ ($Vat \leftarrow Vd1$). This may allow the travel controller 100 to ensure the margin of safety for retaining the level of the automatic driving and allow the host vehicle to safely travel through the automatic driving in the second driving assist mode.

In an example embodiment, the travel controller 100 may automatically lower the vehicle speed to the automatic driving enabling vehicle speed $Vd1$ to allow the second driving assist mode to continue. In another example embodiment, the travel controller 100 may allow the driver to determine whether to continue with the second driving assist mode. In the example embodiment described below, the driver may determine whether to continue with the second driving assist mode.

In a case where the automatic driving enabling vehicle speed $Vd1$ is lower than the set vehicle speed $Vat$ in the second driving assist mode (i.e., $Vd1 < Vat$) due to worsening of the traveling environment, the travel controller 100 may allow the second driving assist mode to continue or to make a transition of the driving mode from the second driving assist mode to the first driving assist mode, in accordance with the selection made by the driver. In a case where the driving mode makes a transition from the second driving assist mode to the first driving assist mode, a change in the traveling environment may be evaluated by the driver to keep the set vehicle speed Vat.

To achieve the driving assist mode, the travel controller 100 includes an automatic driving vehicle speed calculator 101 that calculates the automatic driving enabling vehicle speed, a driving assist mode continuation determiner 102, a driving assist mode selector 103, and a driving assist mode continuing unit 104. With these units, the travel controller 100 may enable the automatic driving in the second driving assist mode to continue even in a case where the traveling environment worsens while the host vehicle is traveling in the second driving assist mode that does not require the driver to hold the steering wheel. In one embodiment, the automatic driving vehicle speed calculator 101 may serve as a "vehicle speed calculator", the driving assist mode continuation determiner 102 as a "mode continuation determiner", the driving assist mode selector 103 as a "mode selector", and the driving assist mode continuing unit 104 as a "mode continuing unit".

In a specific but non-limiting example, the automatic driving vehicle speed calculator 101 may monitor the traveling environment including a change in a weather condition, a change in a road surface condition, a change in a vehicle control condition, and may calculate the automatic driving enabling vehicle speed Vd1 by evaluating parameters that mutually change on the basis of the respective conditions. With regard to the weather condition, the automatic driving vehicle speed calculator 101 may evaluate an influence of a side wind, rain, and snowfall. With regard to the road surface condition, the automatic driving vehicle speed calculator 101 may evaluate an influence of the magnitude of a road surface friction coefficient. Further, with regard to the vehicle control condition, the automatic driving vehicle speed calculator 101 may evaluate, for example but not limited to, controllability of a lateral position of the vehicle with respect to the target route, a visibility distance for controlling a front-rear position of the vehicle, and a steering controllability.

The automatic driving vehicle speed calculator 101 may calculate a vehicle speed that enables stable automatic driving in each of the scenes classified in accordance with the weather condition, the road surface condition, and the vehicle control condition. In the example embodiment, the automatic driving vehicle speed calculator 101 may calculate vehicle speeds for stable automatic driving (hereinafter referred to as "stable automatic driving vehicle speed") $Vd1\_w$, $Vd1\_r$, $Vd1\_s$, and $Vd1\_\mu$ for the respective scenes including a side-wind condition, a rainy (including foggy and snowy) condition, a snowfall condition, and a low-friction road surface condition. The automatic driving vehicle speed calculator 101 may employ, as a definitive automatic driving enabling vehicle speed Vd1, the lowest stable automatic driving vehicle speed out of the stable automatic driving vehicle speeds $Vd1\_w$, $Vd1\_r$, $Vd1\_s$, and $Vd1\_\mu$ that are calculated for the respective scenes.

The driving assist mode continuation determiner 102 may compare the set vehicle speed Vat in the second driving assist mode with the automatic driving enabling vehicle speed Vd1. In a case where the set vehicle speed Vat is equal to or lower than the automatic driving enabling vehicle speed Vd1 (i.e., Vat≤Vd1), the driving assist mode continuation determiner 102 may determine that it is possible to continue with the second driving assist mode. In a case where the set vehicle speed Vat is higher than the automatic driving enabling vehicle speed Vd1 (i.e., Vat>Vd1), the driving assist mode continuation determiner 102 may determine that it is not possible to continue with the second driving assist mode. When determining that it is not possible to continue with the second driving assist mode, the driving assist mode continuation determiner 102 may, via the driving assist mode selector 103, allow the driver to select either one of a continuation of the second driving assist mode that does not require the driver to hold the steering wheel with a reduced vehicle speed or a transition of the driving mode to the first driving assist mode that requires the driver to hold the steering wheel.

Further, the driving assist mode continuation determiner 102 may determine whether the automatic driving enabling vehicle speed Vd1 is lower than a minimum vehicle speed defined, for example, for roadways dedicated to automobiles or a preset lower-limit vehicle speed Vd2. In a case where the automatic driving enabling vehicle speed Vd1 is lower than the preset lower-limit vehicle speed Vd2 (i.e., Vd1<Vd2), the driving assist mode continuation determiner 102 may determine that it is not possible to continue with the driving assist control even if a transition of the driving mode is made to the first driving assist mode. In this case, the driving assist mode continuation determiner 102 may request the driver to manually drive the host vehicle or make a transition of the driving mode to the automatic stopping mode and stop the vehicle after automatically moving the vehicle to a safe location.

In a case where the driving assist mode continuation determiner 102 determines that it is not possible to continue with the second driving assist mode, the alert controller 80 may inform the driver that it is not possible to continue with the level of the automatic driving in the second driving assist mode under the current condition, and the driving assist mode selector 103 may allow the driver to select either one of the continuation of the second driving assist mode and the transition to the first driving assist mode.

The driving assist mode may be selected by requesting the driver to select either one of the continuation of the automatic driving in the second driving assist mode with the set vehicle speed Vat lowered to the automatic driving enabling vehicle speed Vd1 and the lowering the level of the automatic driving from the second driving assist mode in which the driver is not supposed to hold the steering wheel to the first driving assist mode in which the driver is supposed to hold the steering wheel. In a case where it is determined that the driver is holding the steering wheel after the request for the selection, the driving assist mode selector 103 may determine that the first driving assist mode is selected by the driver, and may make an automatic transition of the driving mode from the second driving assist mode to the first driving assist mode.

The driving assist mode continuing unit 104 may allow the second driving assist mode to continue or may make a transition of the driving mode from the second driving assist mode to the first driving assist mode in accordance with the selection result from the driving assist mode selector 103. In a case where the continuation of the second driving assist mode is selected, the driving assist mode continuing unit 104 may lower the set vehicle speed Vat in the second driving assist mode to the automatic driving enabling vehicle speed Vd1 and thus allow the host vehicle to travel through the automatic driving in the second driving assist mode.

Figure 2:
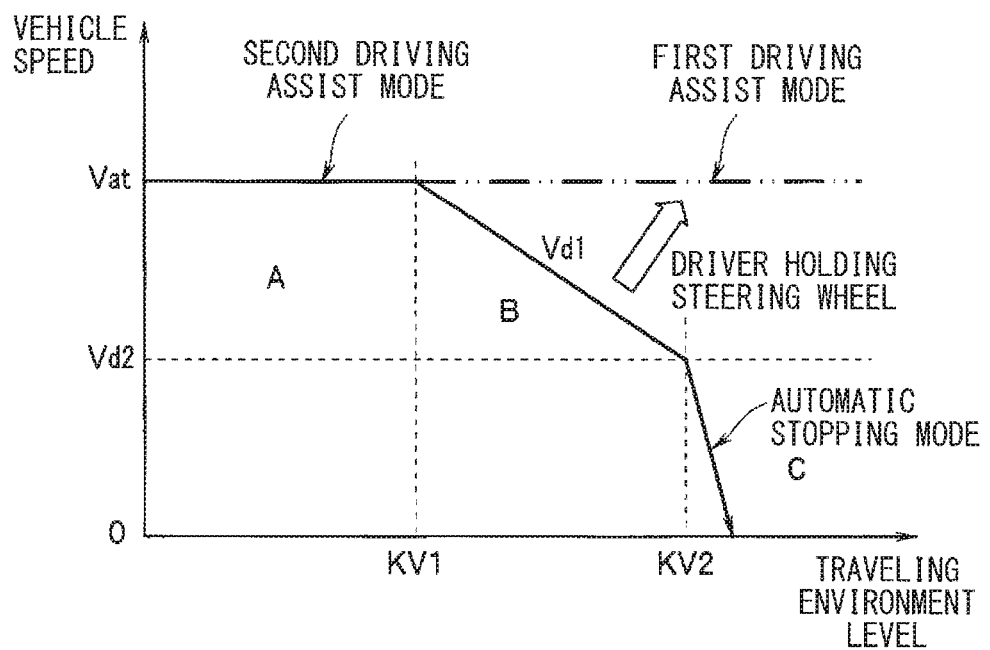
FIG. 2 illustrates an example transition of a driving assist mode.

The continuation of or the transition from the second driving assist mode described above is now described with reference to FIG. 2. In FIG. 2, the vertical axis represents the vehicle speed, and the horizontal axis represents a traveling environment level indicating a change in the traveling environment. The traveling environment level may be an index expressing, in a vehicle speed equivalent value, the traveling environment in which it is possible to continue with the second driving assist mode in relation to the automatic driving enabling vehicle speed Vd1. In FIG. 2, the level of the traveling environment may change from a high level to a lower level along the horizontal axis from the left side toward the right side.

While the host vehicle is traveling in the second driving assist mode as illustrated in a region A in FIG. 2, if the traveling environment level becomes worse than a condition of a traveling environment level KV1 in which Vat>Vd1 holds, the automatic driving enabling vehicle speed Vd1 may decrease substantially linearly relative to the set vehicle speed Vat in accordance with the worsening in the traveling environment level, as illustrated in a region B illustrated in FIG. 2, for example. Thus, it may become difficult to continue with the second driving assist mode unless the vehicle speed is reduced.

In this state, in a case where the driver holds the steering wheel, the driving assist mode continuing unit 104 may make a transition of the driving mode to the first driving assist mode. In a case where the driver refrains from holding the steering wheel, the driving assist mode continuing unit 104 may lower the vehicle speed to bring the set vehicle speed Vat to or below the automatic driving enabling vehicle speed Vd1 (i.e., Vat≤Vd1) and thereby allow the second driving assist mode to continue. In a case where the second driving assist mode is to continue, if the traveling environment further worsens and the automatic driving enabling vehicle speed Vd1 is lower than the preset lower-limit vehicle speed Vd2 and enters a region C where the traveling environment level is worse than the environment level KV2, the driving mode may make a transition from the second driving assist mode to the automatic stopping mode, and the host vehicle may be stopped automatically on, for example, a side strip along a road to ensure the safety.

Figure 3:
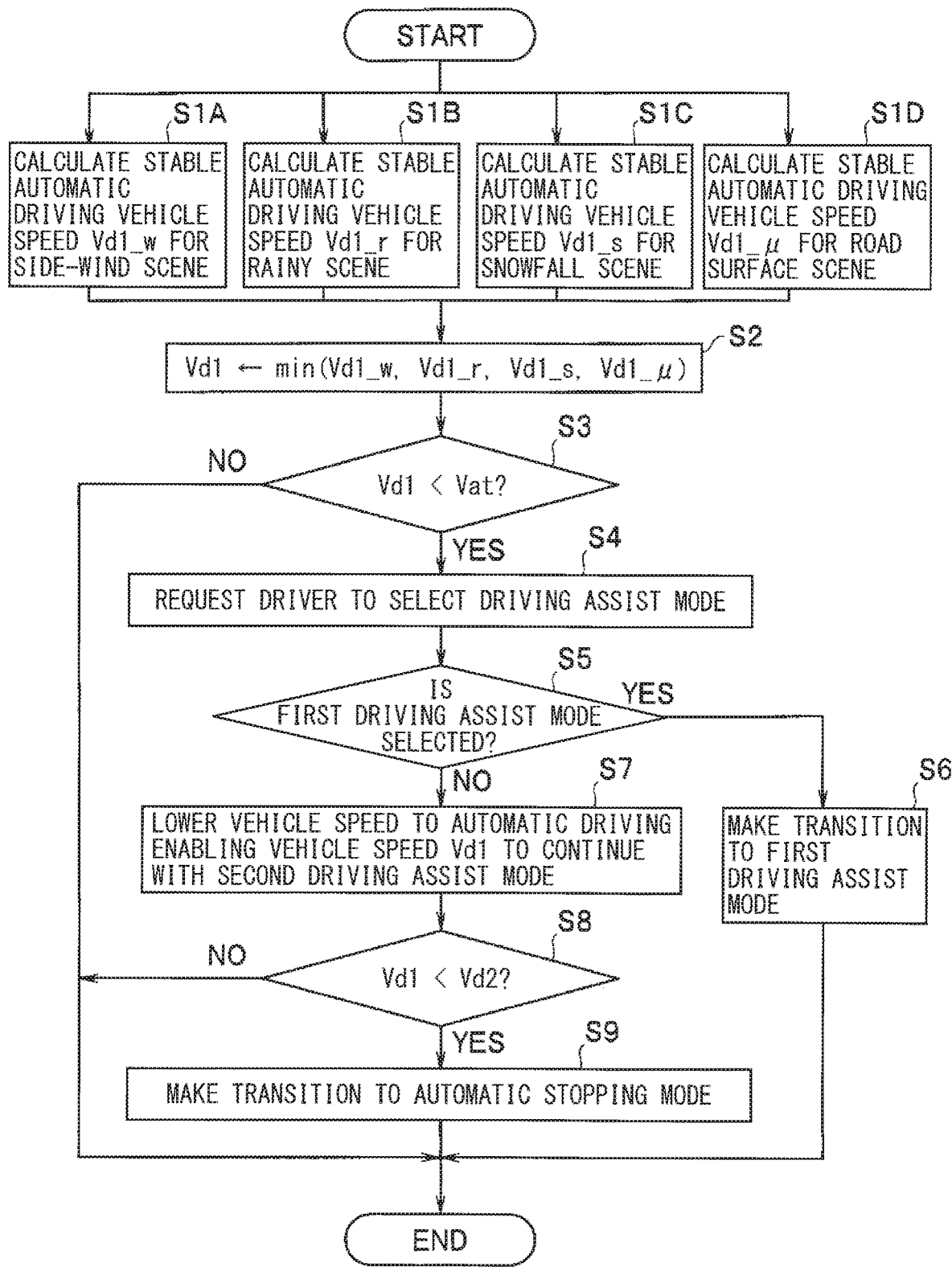
FIG. 3 is a flowchart illustrating an example main routine related to a driving assist mode transition process.
Figure 4:
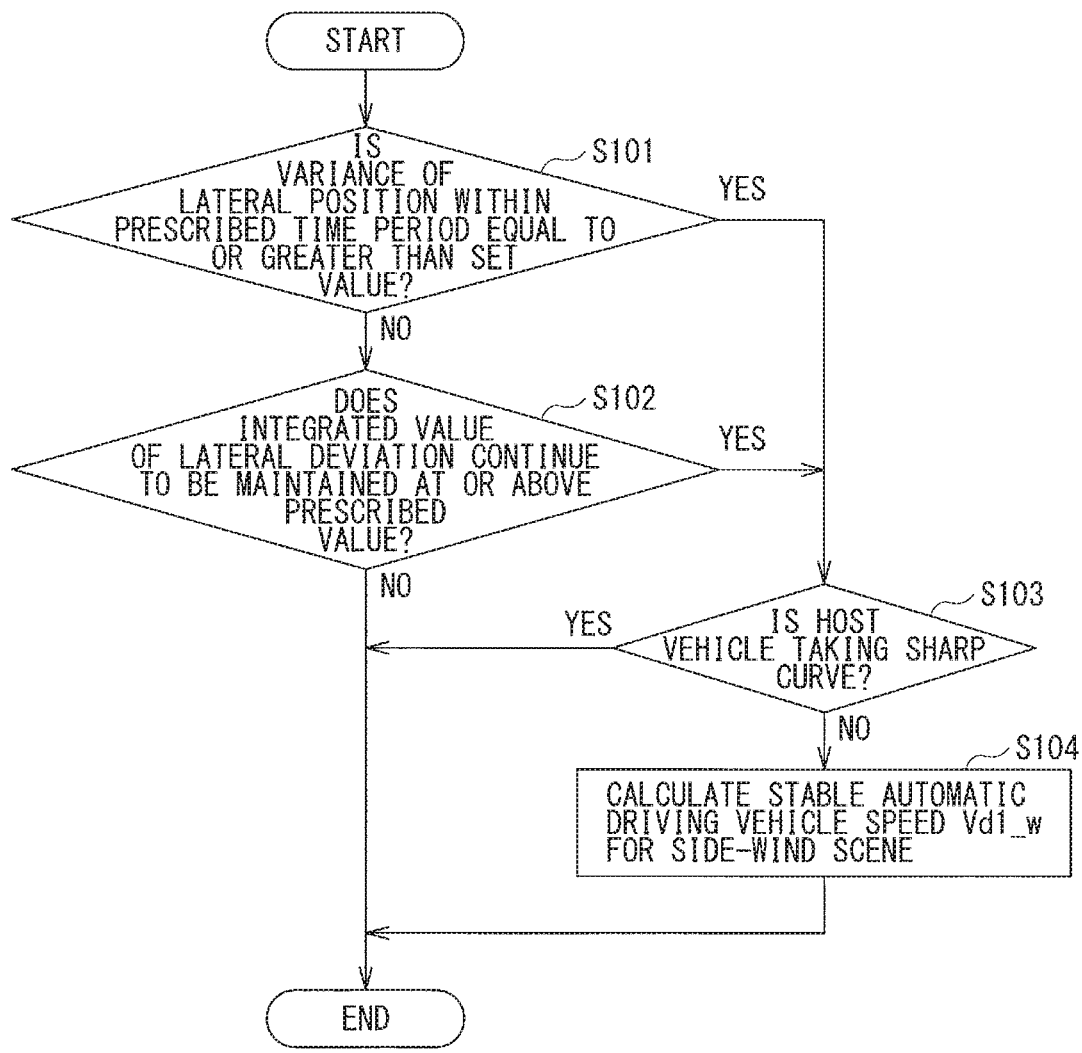
FIG. 4 is a flowchart illustrating an example subroutine related to a process of calculating a stable automatic driving vehicle speed for a side wind.
Figure 5:
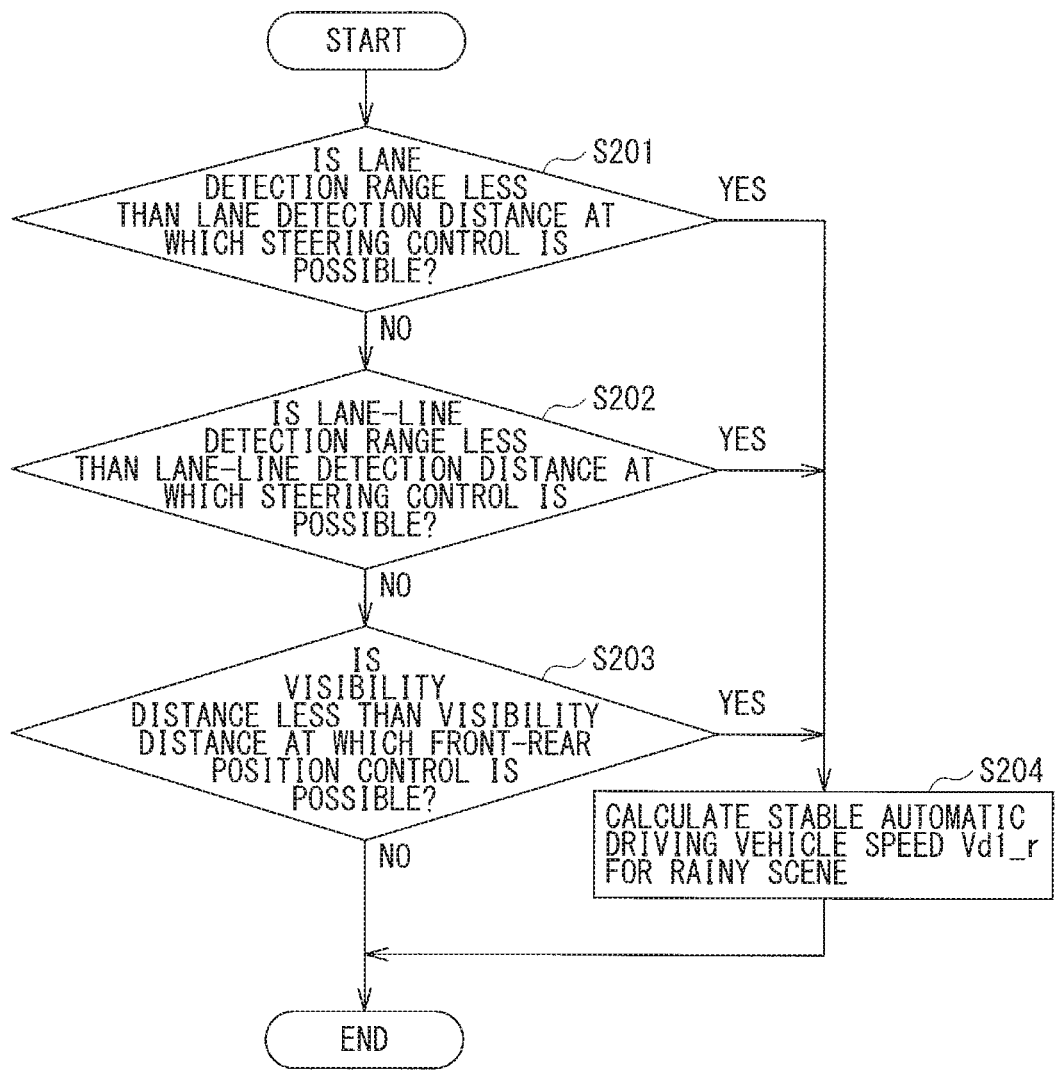
FIG. 5 is a flowchart illustrating an example subroutine related to a process of calculating a stable automatic driving vehicle speed for rainy weather.
Figure 6:
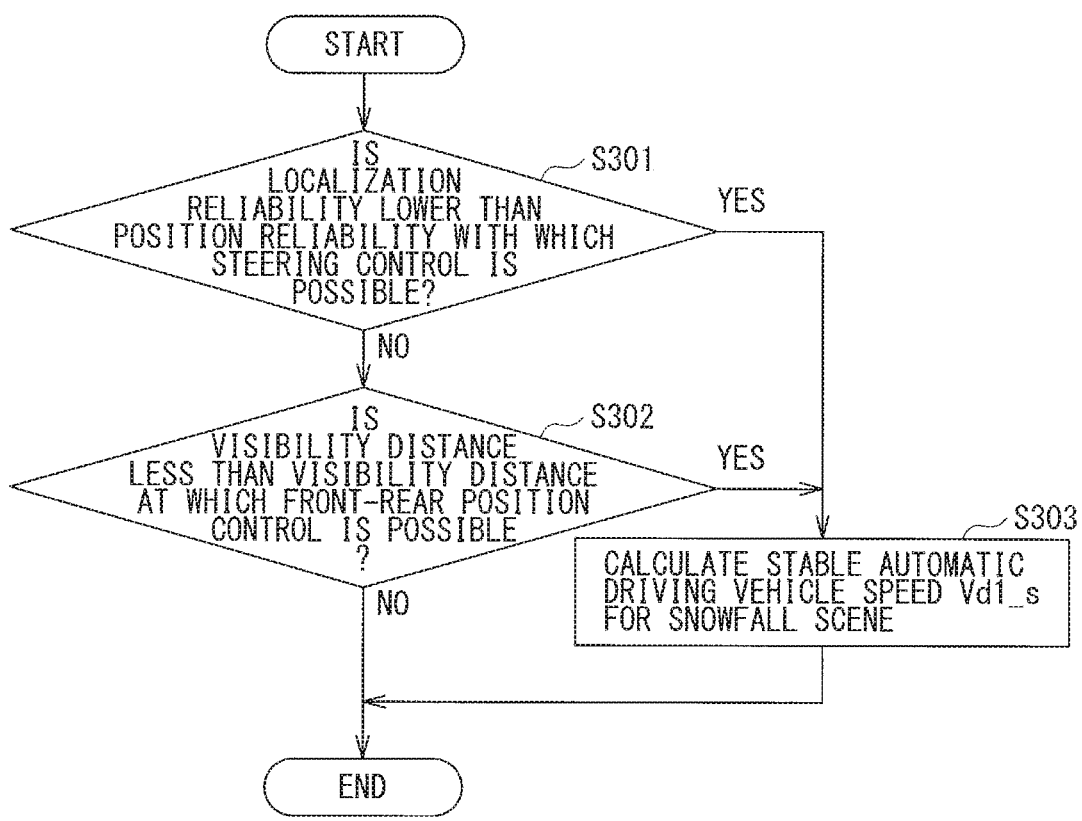
FIG. 6 is a flowchart illustrating an example subroutine related to a process of calculating a stable automatic driving vehicle speed for snowfall.

Next, a transition process of the driving assist modes in the travel controller 100 is described with reference to the flowcharts illustrated in FIGS. 3 to 7. FIG. 3 is a flowchart illustrating an example main routine related to the driving assist mode transition process. FIGS. 4 to 7 are flowcharts illustrating example subroutines related to processes of calculating respective stable automatic driving vehicle speeds in the side-wind scene, the rainy scene, the snowfall scene, and the road surface scene.

First, the main routine related to the driving assist mode transition process illustrated in FIG. 3 is described. In this main routine, the travel controller 100 may first process the subroutines illustrated in FIGS. 4, 5, 6, and 7 in respective steps S1A, S1B, S1C, and S1D in parallel. The respective subroutines assume the side-wind scene, the rainy (including foggy and snowy) scene, the snowfall scene, and the low-friction road scene. The stable automatic driving vehicle speed $Vd1\_w$ may be calculated for the side-wind scene, the stable automatic driving vehicle speed $Vd1\_r$ may be calculated for the rainy (including foggy and snowy) scene, the automatic driving stable vehicle speed $Vd1\_s$ may be calculated for the snowfall scene, and the automatic driving stable vehicle speed $Vd1\_\mu$ may be calculated for the low-friction road scene.

[Stable Automatic Driving Vehicle Speed $Vd1\_w$ for Side Wind Scene]

The automatic driving stable vehicle speed $Vd1\_w$ for the side-wind scene may be calculated, in step S1A, as a vehicle speed that ensures the steering performance to retain the lateral position of the host vehicle within a permissible range relative to the target route. In a specific but not-limiting example, the travel controller 100 may determine, in step S101 at the top of FIG. 4, whether the variance of the lateral position within a prescribed time period is equal to or greater than a set value. In a specific but non-limiting example, the travel controller 100 may determine whether the lateral position within a prescribed time period exceeds a range of from about −10 cm to about +10 cm relative to the target route, for example.

In a case where the variance of the lateral position is less than the set value and is stable in step S101 ("NO" in step S101), the process may proceed to step S102. In step S102, the travel controller 100 may further determine whether the integrated value of the lateral deviation continues to be maintained at a prescribed value to determine an influence of an external disturbance such as superelevation of the road. In a case where the results of steps S101 and S102 indicate that the variance of the lateral position is less than the set value and that the integrated value of the lateral deviation does not continue to be maintained at the prescribed value ("NO" in steps S101 and S102), the travel controller 100 may determine that the automatic traveling in the second driving assist mode is possible despite the external disturbance. In this case, for example, the automatic driving enabling vehicle speed Vd1 may be stored as the stable automatic driving vehicle speed $Vd1\_w$ for the side-wind scene ($Vd1\_w$=Vd1), and the process may return to the main routine.

In contrast, in a case where the variance of the lateral position is equal to or greater than the set value in step S101 ("YES" in step S101) or in a case where the integrated value of the lateral deviation continues to be maintained at the prescribed value in step S102 ("YES" in step S102), the travel controller 100 may determine, in step S103, whether a curve of the road on which the host vehicle is traveling is a sharp curve having a greater curvature than a general curve to be handled in normal automatic traveling. When determining in step S103 that the host vehicle is taking a sharp curve ("YES" in step S103), the travel controller 100 may exit this process because it is not possible to accurately evaluate the influence of an external disturbance, such as a side wind or the superelevation of the road. In a case where the host vehicle is not taking a sharp curve ("NO" in step S103), the process may proceed to step S104.

In step S104, the travel controller 100 may calculate the vehicle speed that ensures the steering performance in lane keeping control with respect to a side wind, the superelevation of the road, and the curvature of the curve by referring to a map based on the variance of the lateral position and the integrated value of the lateral deviation, for example. The calculated vehicle speed may be stored as the stable automatic driving vehicle speed $Vd1\_w$ for the side-wind scene, which will be referred to in the main routine.

[Stable Automatic Driving Vehicle Speed $Vd1\_r$ for Rainy Scene]

The stable automatic driving vehicle speed $Vd1\_r$ for the rainy scene may be calculated, in step S1B, as a vehicle speed that allows for steering along the target route and that ensures the visibility distance necessary for front-rear position control. In other words, the travel controller 100 may first determine, in step S201 in the subroutine illustrated in FIG. 5, whether a lane detection range as detected with the on-board camera unit 11 or based on the map information from the map information processor 30 is less than a lane detection distance at which steering control is possible. In a case where the map information is not available, the travel controller 100 may determine, in step S202, whether the lane-line detection distance detected with the camera unit 11 is less than a lane-line detection distance at which the steering control is possible. Further, the travel controller 100 may determine, in step S203, whether the current visibility distance is less than a visibility distance at which it is possible to control the front-rear position of the host vehicle with respect to the preceding vehicle through, for example but not limited to, brake control.

In a case where the lane-line detection range or the lane detection range based on the map data is equal to or greater than the detection distance at which the steering control is possible and where the visibility distance at which the front-rear position control is possible is ensured ("NO" in steps S201, S202, and S203), the travel controller 100 may determine that the automatic traveling in the second driving assist mode is possible, and the process may return to the main routine. In this case as well, the automatic driving enabling vehicle speed Vd1 may be stored as the stable automatic driving vehicle speed Vd1_r for the rainy scene (Vd1_r=Vd1), which will be referred to in the main routine.

In contrast, in a case where the lane-line detection range or the lane detection range based on the map data is less than the detection distance at which the steering control is possible ("YES" in step S201 or S202) or in a case where the current visibility distance is less than the visibility distance at which the front-rear position control is possible ("YES" in step S203), the process may proceed to step S204. In step S204, the travel controller 100 may calculate the vehicle speed at which it is possible to ensure the steering performance in the automatic driving with respect to the lane detection distance, the lane-line detection distance, and the visibility distance, for example, by referring to the map, for example. The calculated vehicle speed may be stored as the stable automatic driving vehicle speed Vd1_1 for the rainy scene, which will be referred to in the main routine.

[Stable Automatic Driving Vehicle Speed Vd1_s for Snowfall Scene]

The stable automatic driving vehicle speed Vd1_s for the snowfall scene may be calculated, in step S1C, as a vehicle speed that ensures the visibility distance necessary for the steering control without the use of the on-board camera unit 11. In a specific but non-limiting example, the travel controller 100 may determine, in steps S301 and S302 of the subroutine illustrated in FIG. 6, whether the reliability of localization by the positioning device 20 and the map information processor 30 is lower than a position reliability with which the steering control in the automatic driving is possible and whether the visibility distance is less than the visibility distance at which the front-rear position control is possible.

In a case where the reliability of the localization is equal to or higher than the position reliability with which the steering control in the automatic driving is possible ("NO" in step S301) and where the visibility distance is equal to or greater than the visibility distance at which the front-rear position control is possible in step S302 ("NO" in step S302), the travel controller 100 may determine that automatic traveling in the second driving assist mode is possible and the process may return to the main routine. In this case as well, the automatic driving enabling vehicle speed Vd1 may be stored as the stable automatic driving vehicle speed Vd1_s for the snowfall scene (Vd1_s=Vd1).

In contrast, in a case where the reliability of the localization is less than the position reliability with which the steering control in the automatic driving is possible ("YES" in step S301) or in a case where the visibility distance is less than the visibility distance at which the front-rear position control is possible ("YES" in step S302), the process may proceed to step S303. In step S303, the travel controller 100 may calculate the stable automatic driving vehicle speed Vd1_s for the snowfall scene on the basis of the localization reliability or the visibility distance, and the process may return to the main routine.

[Stable Automatic Driving Vehicle Speed Vd1_μ for Road Surface Scene]

The stable automatic driving vehicle speed Vd1_μ for the road surface scene may be calculated, in step S1D, as a vehicle speed that ensures the steering performance by maintaining a steering angle yaw gain for obtaining a target yaw rate even on a slippery road surface.

Figure 7:
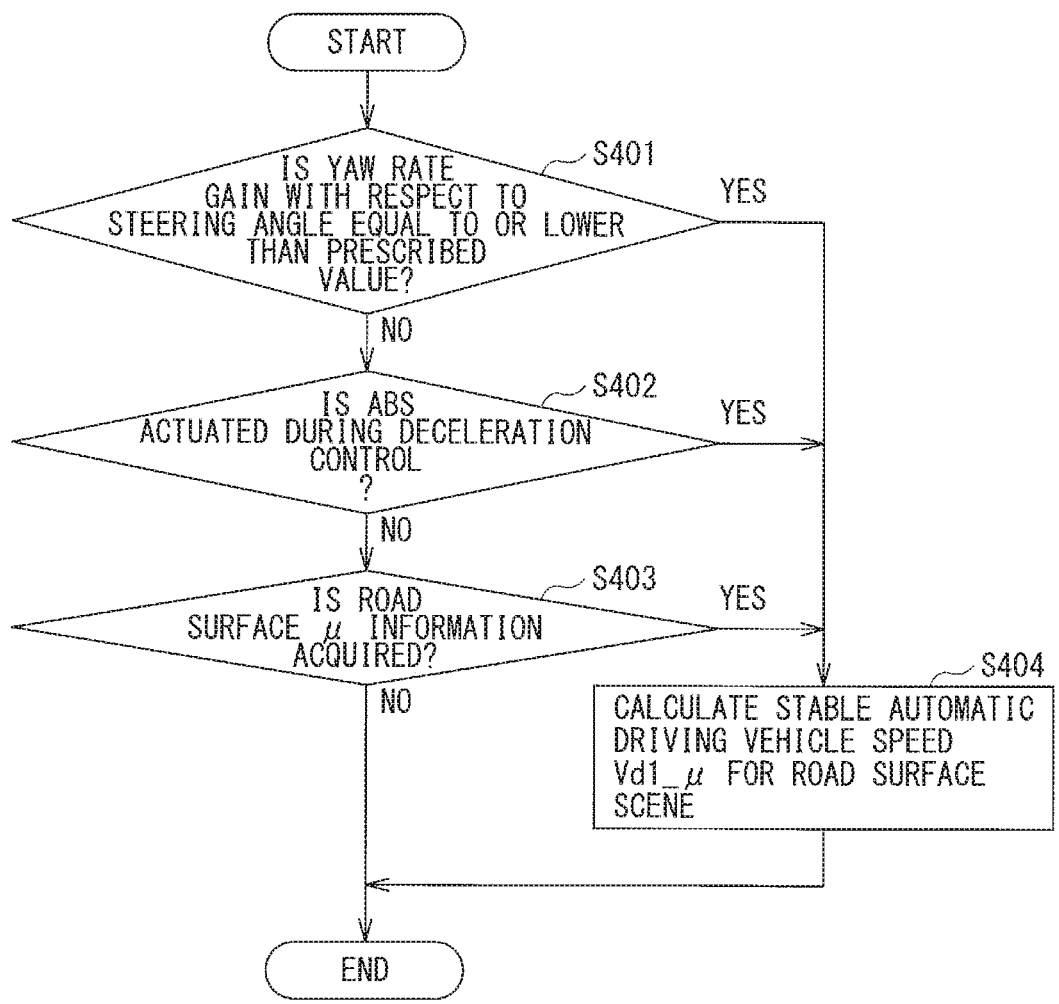
FIG. 7 is a flowchart illustrating an example of subroutine related to a process of calculating a stable automatic driving vehicle speed for a road surface.

In a specific but non-limiting example, the travel controller 100 may determine, in step S401 at the top of the subroutine illustrated in FIG. 7, whether the yaw rate gain with respect to the steering angle is equal to or less than a prescribed value. In other words, the travel controller 100 may determine whether a change in the yaw rate is small with respect to the steering angle and an appropriate yaw angle is not obtained with respect to the traveling direction in the current traveling condition on the road surface.

In a case where the yaw rate gain with respect to the steering angle is equal to or less than the prescribed value ("YES" in step S401), the process may proceed from step S401 to step S404. In step S404, the travel controller 100 may calculate the stable automatic driving vehicle speed Vd1_μ for the road surface scene corresponding to a slippery road surface. The stable automatic driving vehicle speed Vd1_μ for the road surface scene that is held in a case where the yaw rate gain is equal to or less than the prescribed value may be calculated as a vehicle speed at which it is possible to obtain an appropriate yaw angle with respect to the steering angle. For example, a map may be set so as to reduce the vehicle speed as the rate of reduction in the yaw rate gain decreases, and the travel controller 100 may calculate the stable automatic driving vehicle speed Vd1_μ for the road surface scene by referring to this map.

In contrast, in a case where the yaw rate gain with respect to the steering angle is greater than the prescribed value in step S401 ("NO" in Step S401), the process may proceed from step S401 to step S402. In step S402, the travel controller 100 may determine whether an ABS is actuated in deceleration control. In a case where the ABS is actuated in the deceleration control ("YES" in step S402), the stable automatic driving vehicle speed Vd1_μ for the road surface scene may be calculated in step S404. In this case where the ABS is actuated in the deceleration control even though the yaw rate gain with respect to the steering angle is greater than the prescribed value, the stable automatic driving vehicle speed Vd1_μ for the road surface scene may be calculated as a vehicle speed that allows a predetermined deceleration to be obtained without the ABS being actuated. For example, the stable automatic driving vehicle speed Vd1_μ for the road surface scene may be determined on the basis of the frequency of ABS actuation.

Further, in a case where the ABS is not actuated in the deceleration control ("NO" in step S402), the process may proceed from step S402 to step S403. In step S403, the travel controller 100 may determine whether it is possible to acquire information on the road surface friction coefficient (road surface μ) through estimation or detection. In a case where it is not possible to acquire the information on the road surface μ in step S403 ("NO" in step S403), the process may return to the main routine. In a case where it is possible to acquire the information on the road surface μ ("YES" in step S403), the process may proceed to step S404. In step S404, the travel controller 100 may calculate the stable automatic driving vehicle speed Vd1_μ for the road surface scene. In this case, the stable automatic driving vehicle speed Vd1_μ for the road surface scene may be calculated on the basis of the acquired road surface μ.

Returning to the main routine, after the travel controller 100 calculates the stable automatic driving vehicle speeds Vd1_w, Vd1_r, Vd1_s, and Vd1_μ for the respective scenes in steps S1A to S1D, the process may proceed to step S2. In step S2, the travel controller 100 may set, as the automatic driving enabling vehicle speed Vd1, the lowest vehicle speed out of the stable automatic driving vehicle speed Vd1_w for the side-wind scene, the stable automatic driving vehicle speed Vd1_r for the rainy scene, the stable automatic driving vehicle speed Vd1_s for the snowfall scene, and the stable automatic driving vehicle speed Vd1_μ for the road surface scene (Vd1←min(Vd1_w, Vd1_r, Vd1_s, Vd1_μ)). Thereafter, the travel controller 100 may compare, in step S3, the automatic driving enabling vehicle speed Vd1 with the set vehicle speed Vat in the second driving assist mode and may determine whether the automatic driving enabling vehicle speed Vd1 is lower than the set vehicle speed Vat.

In a case where the automatic driving enabling vehicle speed Vd1 is equal to or greater than the set vehicle speed Vat (i.e., Vd1≥Vat) ("NO" in step S3), it may be determined that no particular problem is found in continuing with the automatic driving in the current second driving assist mode, and thus the process may exit this routine and the travel controller 100 may continue with the automatic driving in the second driving assist mode. In contrast, in a case where the automatic driving enabling vehicle speed Vd1 is lower than the set vehicle speed Vat (i.e., Vd1<Vat) ("YES" in step S3), it may be determined it is difficult to continue with the second driving assist mode in the current condition, and the process may thus proceed to step S4.

In step S4, the travel controller 100 may request the driver to select either one of the continuation of the second driving assist mode and the transition to the first driving assist mode. Thereafter, the travel controller 100 may determine, in step S5, whether the first driving assist mode is selected by the driver by detecting whether the driver holds the steering wheel.

In a case where the transition to the first driving assist mode is selected by the driver holding the steering wheel ("YES" in step S5), the travel controller 100 may make a transition of the driving mode from the second driving assist mode to the first driving assist mode to lower the level of the automatic driving in step S6. After the transition to the first driving assist mode, it may be possible to retain the set vehicle speed Vat in the second driving assist mode as the driver handles worsening of the traveling environment.

In contrast, in a case where the continuation of the second driving assist mode is selected by the driver ("NO" in step S5), the travel controller 100 may lower the vehicle speed in the second driving assist mode to the automatic driving enabling vehicle speed Vd1 in step S7. Thus, the travel controller 100 may increase the margin of safety held when the level of the automatic driving in the second driving assist mode is retained in response to worsening of the traveling environment and may allow the second driving assist mode to continue.

Further, the travel controller 100 may determine, in step S8, whether the automatic driving enabling vehicle speed Vd1 is lower than the lower-limit vehicle speed Vd2 due to further worsening of the traveling environment while the host vehicle is traveling in the second driving assist mode. In a case where the automatic driving enabling vehicle speed Vd1 is equal to or higher than the lower-limit vehicle speed Vd2 (i.e., Vd1≥Vd2) ("NO" in step S8), the travel controller 100 may allow the second driving assist mode to continue. In a case where the automatic driving enabling vehicle speed Vd1 is lower than the lower-limit vehicle speed Vd2 (i.e., Vd1<Vd2) ("YES" in step S8), the travel controller 100 may make a transition of the driving mode to the automatic stopping mode in step S9, and may automatically stop the host vehicle on, for example but not limited to, a side strip along a road to ensure the safety.

According to any of the foregoing example embodiments, the level of worsening of the traveling environment may be evaluated while the host vehicle is traveling through the automatic driving in the second driving assist mode that does not require the driver to hold the steering wheel. In a case where the traveling environment worsens, the vehicle speed may be lowered to allow the second driving assist mode to continue. Thus, it is possible to prevent an increase in the burden on the driver that could arise if the automatic driving operation is uniquely limited in response to worsening of the traveling environment or if the transition of the driving mode is made to the driving assist mode in which the driver is supposed to hold the steering wheel. Hence, the driving assist mode that does not require the driver to hold the steering wheel may be allowed to continue to ensure the convenience of the automatic driving. As a result, it is possible to enhance the convenience for the driver.

The travel controller 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the travel controller 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the travel controller 100 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A travel control system for a vehicle, the vehicle including i) a manual driving mode, ii) a first driving assist mode in which driving assist control is performed on a precondition that a driver holds a steering wheel, and iii) a second driving assist mode in which the driving assist control is performed without requiring the driver to hold the steering wheel, the travel control system comprising circuitry configured to:

evaluate a level of worsening of a traveling environment during traveling in the second driving assist mode;

calculate, based on a lateral position of the vehicle relative to a target route to be travelled by the vehicle, a side-wind-scene vehicle speed that ensures the vehicle under the second driving assist mode to travel with respect to a side wind through the traveling environment at the evaluated level of worsening;

calculate, based on a visibility distance or a lane detection range ahead of the vehicle along the target route to be travelled by the vehicle, a rainy-scene vehicle speed that ensures the vehicle under the second driving assist mode to travel with respect to rain through the traveling environment at the evaluated level of worsening;

calculate, based on a degree of localization reliability or the visibility distance ahead of the vehicle along the target route to be travelled by the vehicle, a snowfall-scene vehicle speed that ensures the vehicle under the second driving assist mode to travel with respect to snowfall through the traveling environment at the evaluated level of worsening;

calculate, based on a yaw rate gain, an actuation status of an anti-lock braking system, or road surface information of the target route to be travelled by the vehicle, a road-surface-scene vehicle speed that ensures the vehicle under the second driving assist mode to travel with respect to a slippery road surface through the traveling environment at the evaluated level of worsening;

set, as a first vehicle speed that enables the second driving assist mode to continue even in the traveling environment at the evaluated level of worsening, a lowest vehicle speed out of the side-wind-scene vehicle speed, the rainy-scene vehicle speed, the snowfall-scene vehicle speed, and the road-surface-scene vehicle speed;

compare a second vehicle speed currently set in the second driving assist mode with the calculated first vehicle speed;

in response to determining that the calculated first vehicle speed is lower than the second vehicle speed currently set in the second driving assist mode, determine that it is not possible to continue the second driving assist mode at the currently set second vehicle speed in the traveling environment at the evaluated level of worsening; and in response to determining that it is not possible to continue with the second driving assist mode at the currently set second vehicle speed in the traveling environment at the evaluated level of worsening, lower the second vehicle speed in the second driving assist mode to the first vehicle speed to allow the driving assist control in the second driving assist mode to continue through the traveling environment at the evaluated level of worsening, wherein the travel control system further includes an automatic stopping mode in which the vehicle automatically stops at a safe location, wherein in response to determining that the calculated first vehicle speed is lower than both the second speed vehicle and a preset lower-limit vehicle speed, the circuitry transitions from the second driving assist mode to the automatic stopping mode, and wherein the preset lower-limit vehicle speed is set to be lower than the second speed vehicle.

2. A travel control system for a vehicle, the vehicle including i) a manual driving mode, ii) a first driving assist mode in which driving assist control is performed on a precondition that a driver holds a steering wheel, and iii) a second driving assist mode in which the driving assist control is performed without requiring the driver to hold the steering wheel, the travel control system comprising circuitry configured to:

evaluate a level of worsening of a traveling environment during traveling in the second driving assist mode;

calculate, based on a lateral position of the vehicle relative to a target route to be travelled by the vehicle, a side-wind-scene vehicle speed that ensures the vehicle under the second driving assist mode to travel with respect to a side wind through the traveling environment at the evaluated level of worsening;

calculate, based on a visibility distance or a lane detection range ahead of the vehicle along the target route to be travelled by the vehicle, a rainy-scene vehicle speed that ensures the vehicle under the second driving assist mode to travel with respect to rain through the traveling environment at the evaluated level of worsening;

calculate, based on a degree of localization reliability or the visibility distance ahead of the vehicle along the target route to be travelled by the vehicle, a snowfall-scene vehicle speed that ensures the vehicle under the second driving assist mode to travel with respect to snowfall through the traveling environment at the evaluated level of worsening;

calculate, based on a yaw rate gain, an actuation status of an anti-lock braking system, or road surface information of the target route to be travelled by the vehicle, a road-surface-scene vehicle speed that ensures the vehicle under the second driving assist mode to travel with respect to a slippery road surface through the traveling environment at the evaluated level of worsening;

set, as a first vehicle speed that enables the second driving assist mode to continue even in the traveling environment at the evaluated level of worsening, a lowest vehicle speed out of the side-wind-scene vehicle speed, the rainy-scene vehicle speed, the snowfall-scene vehicle speed, and the road-surface-scene vehicle speed;

compare a second vehicle speed currently set in the second driving assist mode with the calculated first vehicle speed;

in response to determining that the calculated first vehicle speed is lower than the speed currently set in the second driving assist mode, determine whether it is possible to continue with the driving assist control in the second driving assist mode at the currently set second vehicle speed in the traveling environment at the evaluated level of worsening;

when it is determined that it is not possible to continue the second driving assist mode at the currently set second vehicle speed in the traveling environment at the evaluated level of worsening, select a continuation of the second driving assist mode or a transition to the first driving assist mode; and in response to the continuation of the second driving assist mode is selected, lower the second vehicle speed in the second driving assist mode to the first vehicle speed to allow the driving assist control in the second driving assist mode to continue at the first vehicle speed even in the traveling environment at the evaluated level of worsening, wherein the travel control system further includes an automatic stopping mode in which the vehicle automatically stops at a safe location, wherein in response to determining that the calculated first vehicle speed is lower than both the second speed vehicle and a preset lower-limit vehicle speed, the circuitry transitions from the second driving assist mode to the automatic stopping mode, and wherein the preset lower-limit vehicle speed is set to be lower than the second speed vehicle.

* * * * *